United States Patent [19]
Forrester

[11] Patent Number: 5,142,603
[45] Date of Patent: Aug. 25, 1992

[54] METHOD OF CONNECTING HIGH NUMERICAL APERTURE OPTICAL WAVEGUIDES

[75] Inventor: David S. Forrester, Ipswich, England

[73] Assignee: British Telecommunications public limited company, London, England

[21] Appl. No.: 601,686

[22] PCT Filed: Apr. 28, 1989

[86] PCT No.: PCT/GB89/00455
§ 371 Date: Oct. 24, 1990
§ 102(e) Date: Oct. 24, 1990

[87] PCT Pub. No.: WO89/10332
PCT Pub. Date: Nov. 2, 1989

[30] Foreign Application Priority Data
Apr. 29, 1988 [GB] United Kingdom ............... 8810286

[51] Int. Cl.$^5$ .............................................. G02B 6/18
[52] U.S. Cl. ................................ 385/98; 65/4.21; 156/158; 385/96
[58] Field of Search ................... 65/4.1, 4.2, 4.21; 156/158; 350/96.21, 96.31; 385/98, 96

[56] References Cited

U.S. PATENT DOCUMENTS

| | | | |
|---|---|---|---|
| 3,819,249 | 6/1974 | Borner et al. | 65/3.11 |
| 4,252,403 | 2/1981 | Salisbury | 350/96.31 |
| 4,784,466 | 11/1988 | Khoe et al. | 350/96.33 |
| 4,900,114 | 2/1990 | Mortimore et al. | 385/96 |

FOREIGN PATENT DOCUMENTS

| | | |
|---|---|---|
| 76186 | 4/1983 | European Pat. Off. |
| 3609407 | 9/1987 | Fed. Rep. of Germany |
| 564111 | 1/1981 | Japan |
| 57-24906 | 2/1982 | Japan |
| 2128766 | 12/1985 | United Kingdom |
| 2169096 | 7/1986 | United Kingdom |

OTHER PUBLICATIONS

Mathyseek, New Coupling arrangement Between Diode and Fiber, 10th European Cont. on Optical Communication, Sep. 1984, pp. 186-187.

Botham, Tapering Fibers by Controlled Core Diffusion, Electronic Letters, Feb. 18, 1988, vol. 24, No. 4, pp. 243-244.

Harper, Tapers in Fibre by Controlled Core Diffusion, Electronic Letters, Feb. 18, 1988, vol. 24, No. 4, pp. 245-266.

Primary Examiner—W. Gary Jones
Assistant Examiner—John J. Bruckner
Attorney, Agent, or Firm—Nixon & Vandehye

[57] ABSTRACT

A method of splicing optical fibres is described in which at least one of the fibers has a high numerical aperture (NA) and the two fibres have different mode spot sizes. The method comprises fusing the ends of the fibres together with their cores in alignment and heating the fused junction between the fibres so as to cause dopant to migrate out of the core. The heating step is carried out for a time sufficient to achieve a predetermined level of matching between propagation modes in the two fibres.

13 Claims, 3 Drawing Sheets

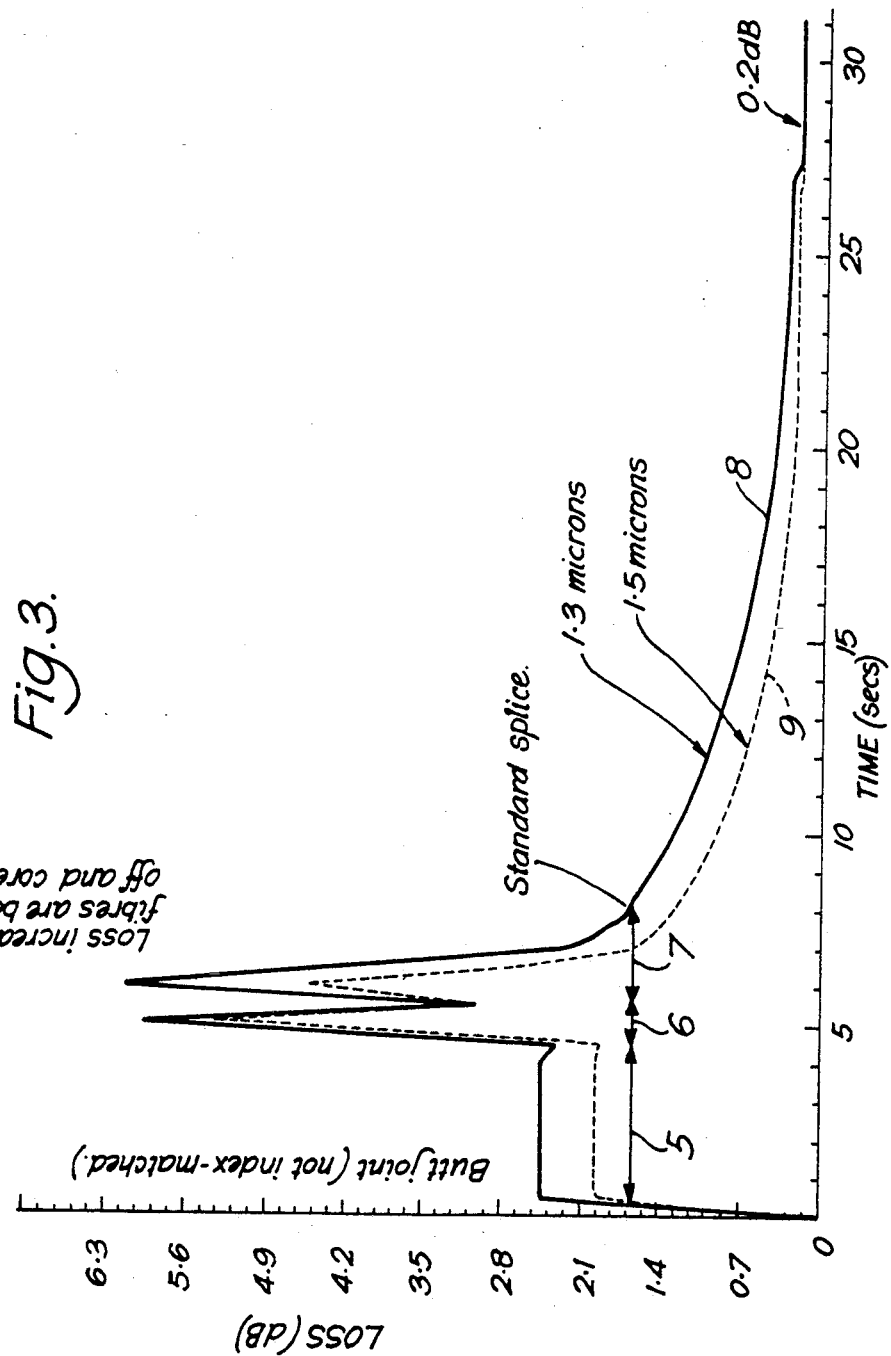

METHOD OF CONNECTING HIGH NUMERICAL APERTURE OPTICAL WAVEGUIDES

The invention relates to methods for connecting optical waveguides, such as optical fibres.

A conventional optical waveguide comprises a length of dielectric material having a cross-sectional refractive index profile which is peaked such that optical radiation travelling along the length of material is guided to remain within the material of the waveguide. The material within the peak region is generally known as the core, and the material outside the peak region is generally known as the cladding.

Conventionally, optical waveguides of this type are connected or spliced together by bringing adjacent ends of the waveguides together under force in the presence of an electrical arc which, after the ends have been brought together, is turned off. This causes the fibres to fuse together. In some cases, the fused joint is annealed to improve mechanical strength. It is important to take account of the major splice loss mechanisms which exist in order to minimise losses resulting from the fused connection. In general, these loss mechanisms can be divided into three:

Transverse core offsets—this is caused by the core being non-concentric with the waveguide so that even if the waveguides are accurately aligned, the cores are not.

Core deformation—this is caused by poor alignment of the waveguides before the splice and/or the fact that the adjacent ends of the waveguides are not aligned.

Mode field mismatch—the refractive index profile controls the cross-sectional width of an optical field propogating in the waveguide as measured between the $1/e$ intensity levels and is characterised by the "mode spot size".

In a typical monomode fibre having a core diameter of about 8 $\mu$m, the mode spot size will be in the order of 9 $\mu$m. If the mode spots have different shapes (or sizes) in the two waveguides then there will be significant losses at the joint.

If the two waveguides have significantly different mode spot sizes, then the mode mismatch will be the dominant loss mechanism. Various proposals have been made to deal with this. For example, EP-A-0076186 describes a method of heating the ends of the fibres to a temperature of 800° C. to 1200° C. for a period of 24 to 48 hours to cause migration of dopant in the core in to the cladding since this results in modification of the refractive index of the optical fibre and a corresponding change in the mode spot size. The main disadvantages of this process are the need for a lengthy pre-treatment (1 to 2 days) and the necessity to cleave the fibre in the correct place to match mode sizes.

The effect of fluorine migration from cladding to core on the refractive index profile has been described in "Theory of tapering single-mode optical fibre by controlled core diffusion" by C. P. Botham and "Tapers in single-mode optical fibre by controlled core diffusion" by J. S. Harper, C. P. Botham, and S. Hornung both in Electronics Letters Feb. 18, 1988, vol. 24 No. 4, pages 243-246. Both these papers are concerned with a single fibre and the effect on that fibre of a heating process and illustrate typical heating times in the order of 1 hour or more.

In accordance with the present invention, a method of connecting optical waveguides having different refractive index profiles and at least one of the waveguides having a high numerical aperture (NA) comprises fusing the ends of the waveguides together with their cores in alignment and subsequently heating the fused junction between the waveguides so as to cause dopant to migrate out of the core of the high-NA waveguide, the heating step being carried out for a time sufficient to achieve a predetermined level of matching between the mode spot sizes in the two waveguides.

We have found that in the proposals described above, all of which are concerned with low NA fibres, losses increase rapidly when the fibres are subjected to heat treatment. In contrast, we have found that a post fusion heat treatment is surprisingly effective when at least one of the waveguides has a high-NA. When splicing a high-NA fibre to a standard fibre the differential migration rates in the two fibres produces a quick equalisation of mode spot sizes. When splicing two high-NA fibres together the two cores quickly grow in size together reducing physical mismatch such as transverse core offsets. We have found that highly doped, high-NA fibres have rapid migration of the dopant on heating that leads to a short post splice heat treatment to effect mode spot size matching or transverse core offset reduction. It has been found that by choosing a suitable heating power it is possible to achieve significant mode spot size matching within a comparatively short time, typically in the order of 30 seconds. The post heating could be carried out using the same arc as is used to achieve fusion or by some other heating process and in the former case heating power will be determined by suitably choosing the arc current.

In practice the temperature reached during the post heating process will be higher than has hitherto been achieved for example in the known anneal procedures and in EP-A-0076186. Typically, temperatures in the order of 1400° C.-1600° C. will be used.

In one example, the variation of propagation loss can be monitored during the fusion and post heating process in order to determine when the post heating process should be stopped. Alternatively, this monitoring process can be carried out in a preliminary step to determine the appropriate heating time and for subsequent connections, the post heating process can be applied for that predetermined time without real time monitoring being necessary.

Preferably, the heating step is carried out until propagation losses reach a minimum. Alternatively, or additionally, the heating process can be carried out until propagation losses are reduced by at least 1 dB over the loss occuring when the waveguides are butted together but not fused.

The numerical aperture of the high-NA waveguide will generally be at least 0.15 and typically lie in the range 0.15 to 0.3.

The invention is particularly applicable to the connection of a conventional monomode optical fibre to a high-NA fibre. Such high-NA fibres are used in fibre lasers and for coupling optical power out of lasers. The invention is also applicable to the connection of two high-NA fibres.

The apparatus for carrying out the method may be a conventional optical fibre splicing apparatus suitably adjusted in particular to modify the arc duration and arc current from conventional values.

An example of a method in accordance with the invention will now be described with reference to the accompanying drawings, in which.

As has been mentioned previously, the invention is particularly suitable for use in splicing high-NA optical fibres. These splices may involve the connection of a high-NA fibre to standard fibre, or the connection of two high-NA fibres. In this example, the connection of a high-NA fibre to a standard fibre will be described.

The numerical aperture (NA) of an optical fibre is given by $$(n_{co}^2 - n_{cl}^2)^{\frac{1}{2}} \simeq (2 \times n_{cl} \times \delta n)^{\frac{1}{2}}$$

where $n_{co}$ is the refractive index of the core, $n_{cl}$ is the refractive index of the cladding, and $\delta n = n_{co} - n_{cl}$.

Figure 1:
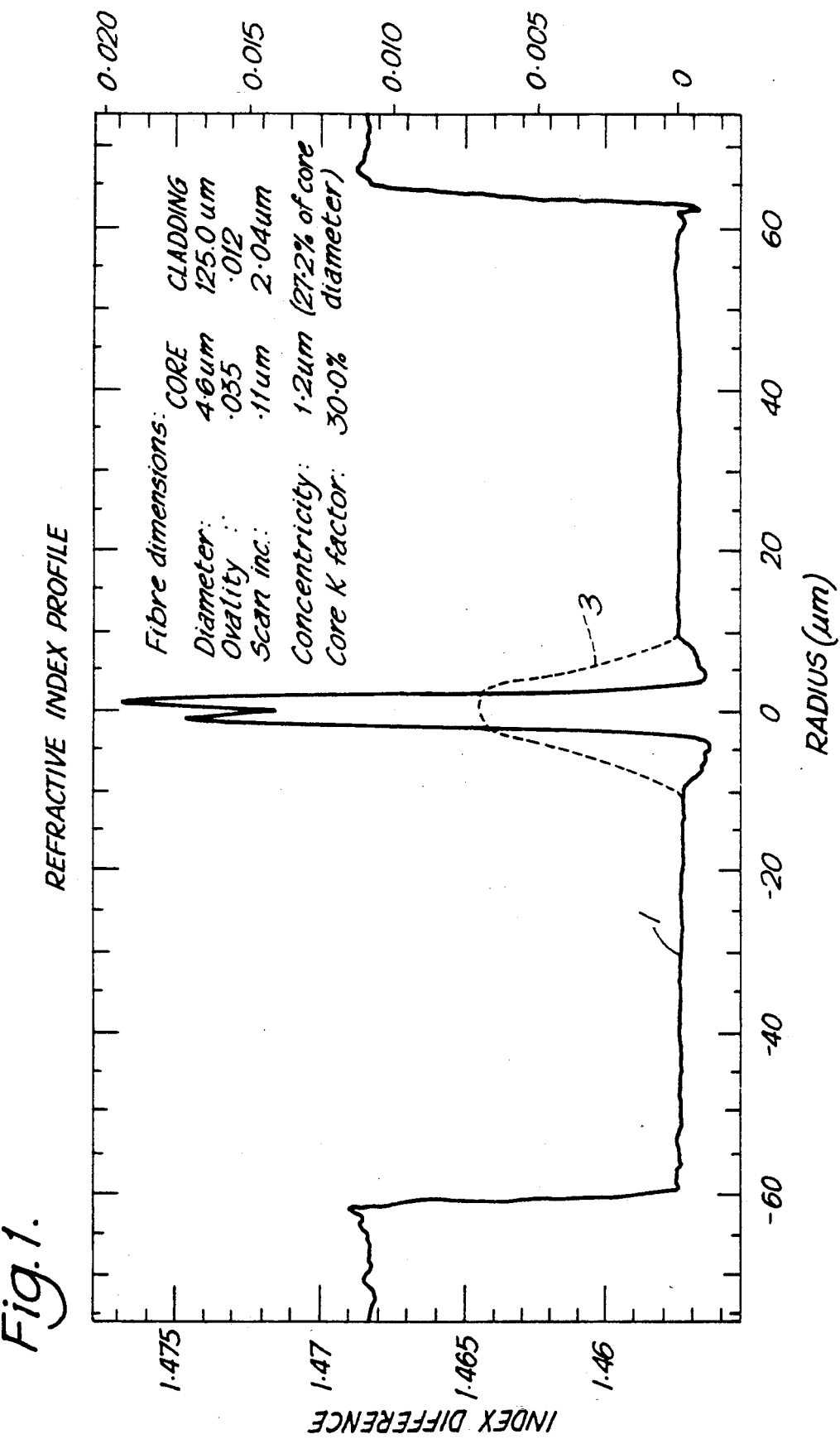
FIG. 1 illustrates the refractive index profile of a high-NA optical fibre before and after splicing.

High-NA fibres have a large $\delta n$ typically in the range of 0.02 to 0.008 corresponding to an NA in the range 0.24 to 0.15. In germania doped silica fibres this is achieved by having a large germania concentration in the core region. FIG. 1 illustrates with a line 1 the refractive index profile of such a high-NA fibre. This fibre will have a core radius, a, of about 2 microns and a mode radius of about 2 microns.

Figure 2:
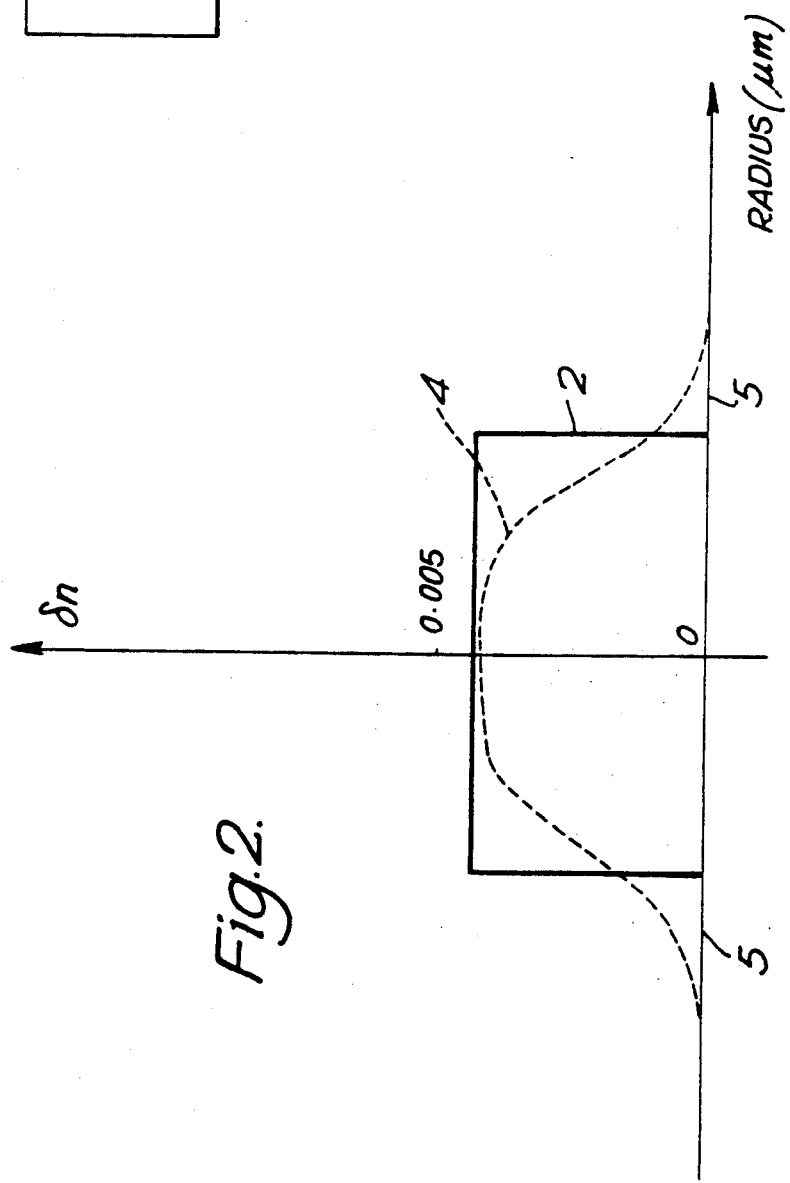
FIG. 2 is a diagram similar to FIG. 1 but for a conventional, monomode optical fibre; and, FIG. 3 illustrates the variation in propagation loss with time.

The refractive index profile of a conventional, monomode fibre to which the high-NA fibre is to be spliced is shown in FIG. 2 by a line 2. In this case, $\delta n$ is about 0.004, a is about 4 microns and the mode radius is about 5 microns. It will be appreciated therefore that there is a significant difference in mode spot size between the two fibres.

After preparing the ends of the fibres in a conventional manner so as to be as flat as possible, the fibres are mounted in a conventional splicing machine and backed off by a small distance to allow an arc to be struck through the space between the fibres. The fibres are then brought together at speed in the presence of the arc which causes the fibres to fuse. In contrast to conventional splicing, the arc is maintained on for a total of 25 to 30 seconds.

The effect of this additional heating after fusion is to cause the dopant in the core of the high-NA fibre to migrate into the cladding of that fibre. This migration will cause changes in the refractive indices of the core and cladding and effectively reduce the value of $\delta n$ for that fibre. This migration occurs much more quickly in the high-NA fibre than in the standard fibre due to the high concentration of dopant in the core. This high concentration lowers the "softening" temperature of the core (as compared to the cladding, or to the core of the less heavily doped fibre), so that the mobility of the germanium atoms is greatly increased at any given temperature.

Since the mode width in an optical fibre is very strongly dependent upon the value of $\delta n$ and the core radius, a, especially when a is small, small changes in $\delta n$ and a, brought about by diffusion of the core dopant, can produce large changes in the mode width.

As can be seen in FIG. 1, after heating for about 25 seconds, the refractive index profile has changed significantly to the form shown by the line 3. However, as shown in FIG. 2, it will be seen that the refractive index of the conventional or standard fibre has changed very little as shown by the line 4. However, a comparison of these diagrams will indicate that the refractive index profiles 3, 4 are now very similar.

The arc current during the post heating process is chosen so that the temperature of the fibres is raised to their softening point typically in the order of 1400°–1600° C.

The effect on propagation loss during the process can be seen in FIG. 3. Initially, the two fibres are butted together during a period 5. They are then backed off which will inevitably cause an incease in losses, while the arc is struck during a period 6. While the arc is maintained on the fibres are brought together and fused. In a standard splicing technique, the arc would be turned off at the end of a period 7, about 2 to 3 seconds after the fibres are brought together. In the invention, however, heating is continued by maintaining the arc on and it will be seen that gradually losses continue to decrease until they reach a minimum of about 0.2 dB at about 25 seconds after the fibres were brought together in the presence of the arc. FIG. 3 illustrates the effect on losses at 1.3 microns (line 8) and at 1.5 microns (line 9) and it will be seen that these are very similar.

Although the invention has been described in connection with a highly doped core, it is also applicable to fibres having a highly doped cladding (for example with fluorine or boron dopant) to decrease the refractive index of the cladding or a combination of these.

Figure 4:
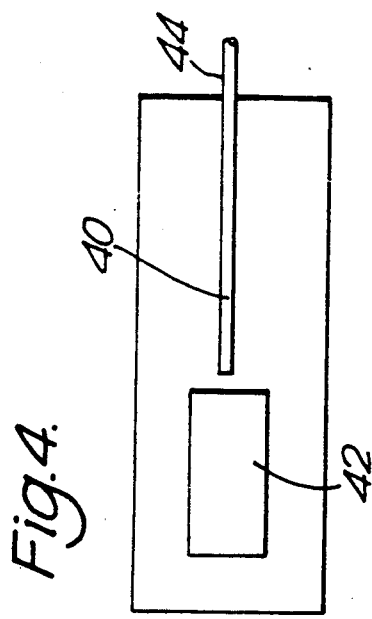
FIG. 4 is a schematic diagram of a high NA fibre spliced to a low NA communications fibre and coupled to a semiconductor laser.

Referring now to FIG. 4, there is shown a high NA fibre 40 positioned to couple light from a semiconductor laser 42 and spliced to a low NA communications fibre 42 by the above described method of the present invention. This combination provides a low loss coupling between the laser 42 and the communications fibre 44. This combination can be supplied as a package, the first 44 being a pig tail for splicing by conventional means to a similar fibre (not shown) of an optical communications system.

I claim:

1. A method of connecting optical waveguides having different refractive index profiles and at least one of the waveguides having a numerical aperture of approximately 0.15 or higher, the method comprising:
   fusing the ends of the waveguides together with their respective cores in alignment, and
   subsequently heating the fused junction between the waveguides so as to cause dopant to migrate out of the core of the at least one waveguide having a numerical aperture of approximately 0.15 or higher,
   the subsequently heating step being carried out for a time sufficient to achieve an approximate matching between the mode spot sizes in the two waveguides near said fused junction.

2. A method according to claim 1, wherein the subsequently heating step is carried out for a time not exceeding 30 seconds.

3. A method according to claim 1, wherein the fused junction is heated to at least 1400° C. during the subsequently heating step.

4. A method according to claim 1, wherein the subsequently heating step is carried out until propagation losses reach a minimum.

5. A method according to claim 1, wherein the subsequently heating step is carried until propagation losses have been reduced by at least 1 dB over the losses occurring when the waveguides are butted together but not fused.

6. A method according to claim 1, further comprising monitoring the propagation losses during the subsequently heating step.

7. A method according to claim 1, wherein the subsequently heating step continues for substantially longer than 10 seconds.

8. A method according to claim 1, wherein the numerical aperture of the said at least one waveguide lies in the range 0.15 to 0.3.

9. A method according to claim 1, wherein the waveguides comprise optical fibres.

10. A high-NA optical fibre of approximately 0.15 numerical aperture or higher fused end to end with another optical fibre in accordance with the method of claim 1.

11. A combination according to claim 10, wherein the another optical fibre has a numerical aperture substantially less than approximately 0.15.

12. A combination as claimed in claim 11 in which the high NA fibre is optically coupled to an optical source.

13. A combination as claimed in claim 12 in which the optical source is a semiconductor laser.

* * * * *